US011563627B2

(12) United States Patent
Fagan

(10) Patent No.: US 11,563,627 B2
(45) Date of Patent: Jan. 24, 2023

(54) REMOTE PROBING FOR FAILOVER

(71) Applicant: Verizon Patent and Licensing Inc., Arlington, VA (US)

(72) Inventor: Scott Fagan, Red Wing, MN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 123 days.

(21) Appl. No.: 16/678,293

(22) Filed: Nov. 8, 2019

(65) Prior Publication Data
US 2021/0144050 A1 May 13, 2021

(51) Int. Cl.
*H04W 4/00* (2018.01)
*H04L 41/0668* (2022.01)
*H04L 45/00* (2022.01)
*H04W 40/02* (2009.01)
*H04W 88/16* (2009.01)

(52) U.S. Cl.
CPC .......... *H04L 41/0668* (2013.01); *H04L 45/22* (2013.01); *H04W 40/02* (2013.01); *H04W 88/16* (2013.01)

(58) Field of Classification Search
None
See application file for complete search history.

(56) References Cited

U.S. PATENT DOCUMENTS

| | | | | |
|---|---|---|---|---|
| 2005/0238006 A1* | 10/2005 | Taylor | .............. | H04L 45/28 370/389 |
| 2007/0165516 A1* | 7/2007 | Xu | .............. | G06F 11/2028 370/225 |
| 2008/0080365 A1* | 4/2008 | Weeresinghe | .......... | H04L 69/40 370/216 |
| 2009/0282137 A1* | 11/2009 | Qiu | ............ | H04L 67/1008 709/223 |
| 2010/0234025 A1* | 9/2010 | Julka | ............ | H04W 28/08 455/436 |
| 2011/0216767 A1* | 9/2011 | Ballard | ............ | H04L 12/56 370/389 |
| 2012/0063300 A1* | 3/2012 | Sahin | ............ | H04W 36/12 370/225 |
| 2012/0084449 A1* | 4/2012 | Delos Reyes | ....... | H04W 12/062 709/229 |
| 2012/0134259 A1* | 5/2012 | Bonnier | ............ | H04W 40/24 370/221 |
| 2012/0239966 A1* | 9/2012 | Kompella | ............ | H04W 24/04 714/4.11 |
| 2012/0263453 A1* | 10/2012 | Cohn | ............ | H04Q 11/0066 398/5 |
| 2013/0010609 A1* | 1/2013 | Lund | ............ | H04L 69/40 370/242 |
| 2013/0114402 A1* | 5/2013 | Ould-Brahim | .......... | H04L 41/06 370/225 |

(Continued)

*Primary Examiner* — Bob A Phunkulh

(57) ABSTRACT

A method, a device, and a non-transitory storage medium are described in which a remote probing for failover service is provided. The remote probing for failover service includes receiving, by a network device at a standby location associated with a geographic redundancy, failover traffic, which originates at a primary location of a network. The network device routes the failover traffic back to a corresponding network device at the primary location. The network device at the primary location may provide the failover traffic to a network performance analyzer device at the primary location.

20 Claims, 13 Drawing Sheets

(56) References Cited

U.S. PATENT DOCUMENTS

| | | | |
|---|---|---|---|
| 2013/0172031 A1* | 7/2013 | Calippe | H04W 8/26 455/509 |
| 2014/0018064 A1* | 1/2014 | Taglienti | H04W 24/04 455/424 |
| 2014/0078890 A1* | 3/2014 | Lu | H04W 36/0022 370/221 |
| 2019/0372908 A1* | 12/2019 | Featonby | H04L 67/1095 |
| 2021/0235244 A1* | 7/2021 | Bartolomé Rodrigo | H04L 67/16 |
| 2022/0035541 A1* | 2/2022 | Genereux | G06F 3/061 |

* cited by examiner

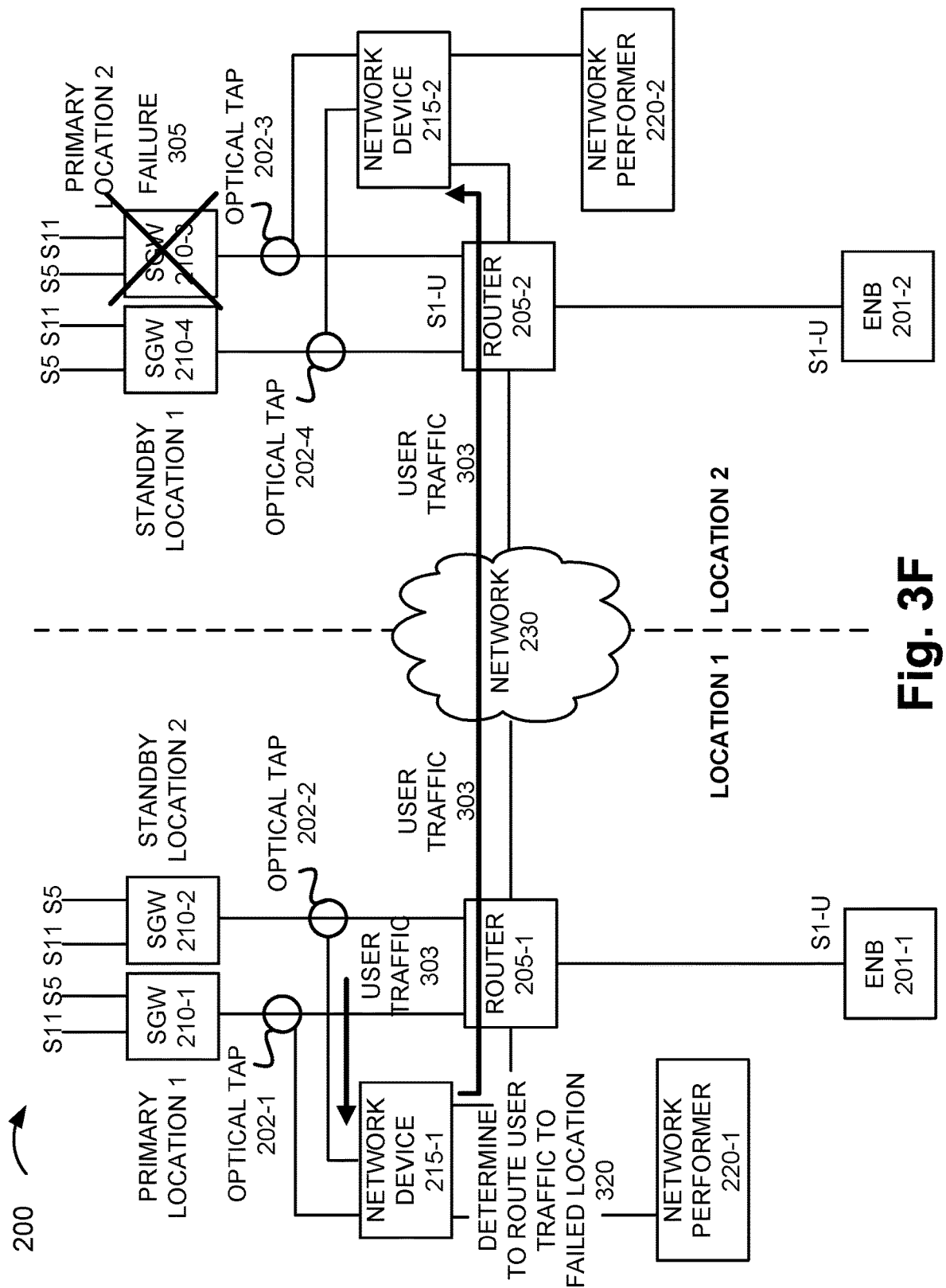

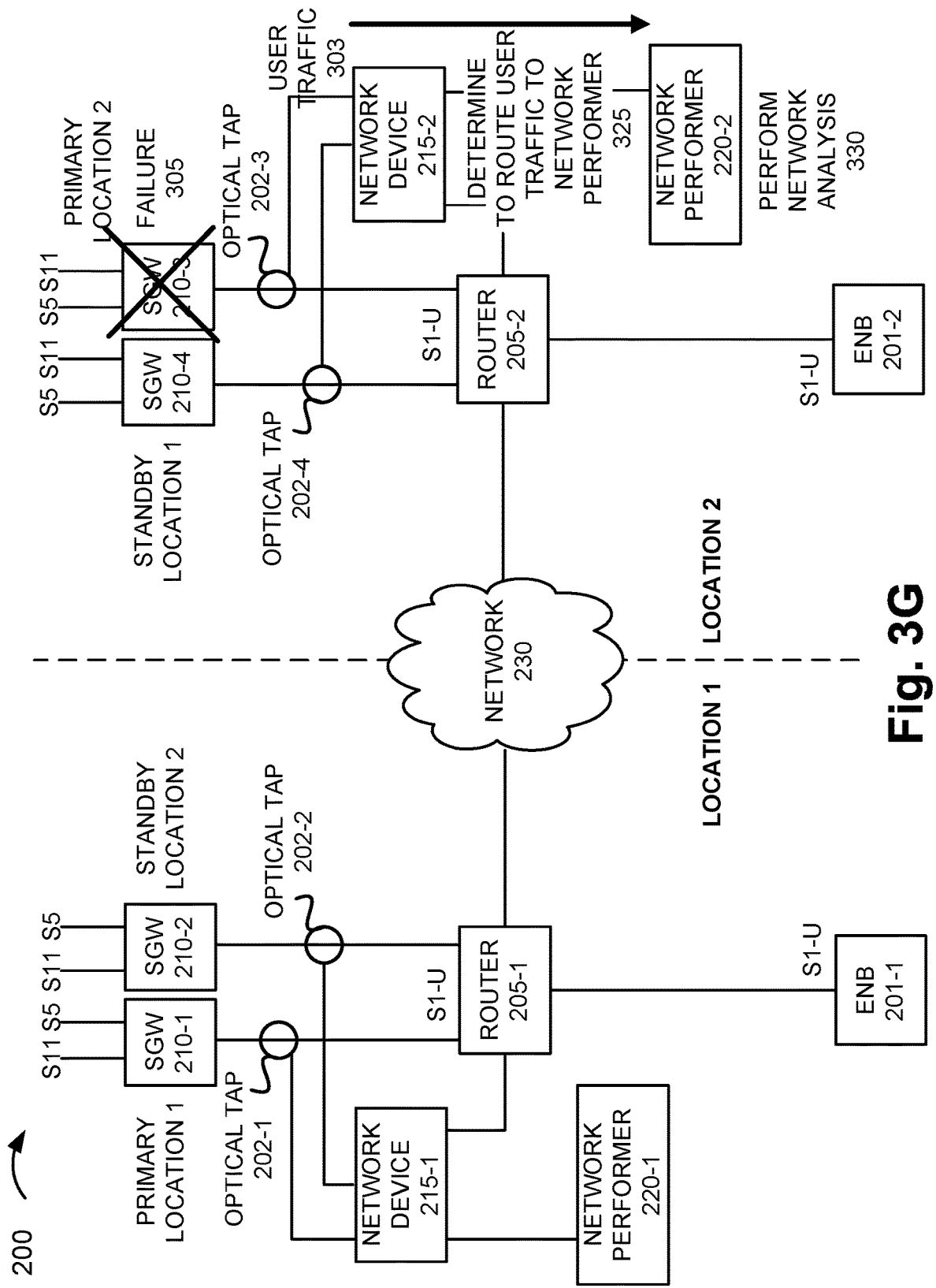

REMOTE PROBING FOR FAILOVER

BACKGROUND

Development and design of radio access networks (RAN), core networks, and application service networks, present certain challenges from a network-side perspective and an end device perspective. For example, when a network suffers a failure at a network device, various failover procedures may be performed to route traffic along a network path that minimizes the impact of the failure.

BRIEF DESCRIPTION OF THE DRAWINGS

FIGS. 3A-3G are diagrams illustrating an exemplary process of an exemplary embodiment of the remote probing for failover service;

DETAILED DESCRIPTION OF PREFERRED EMBODIMENTS

Figure 1:
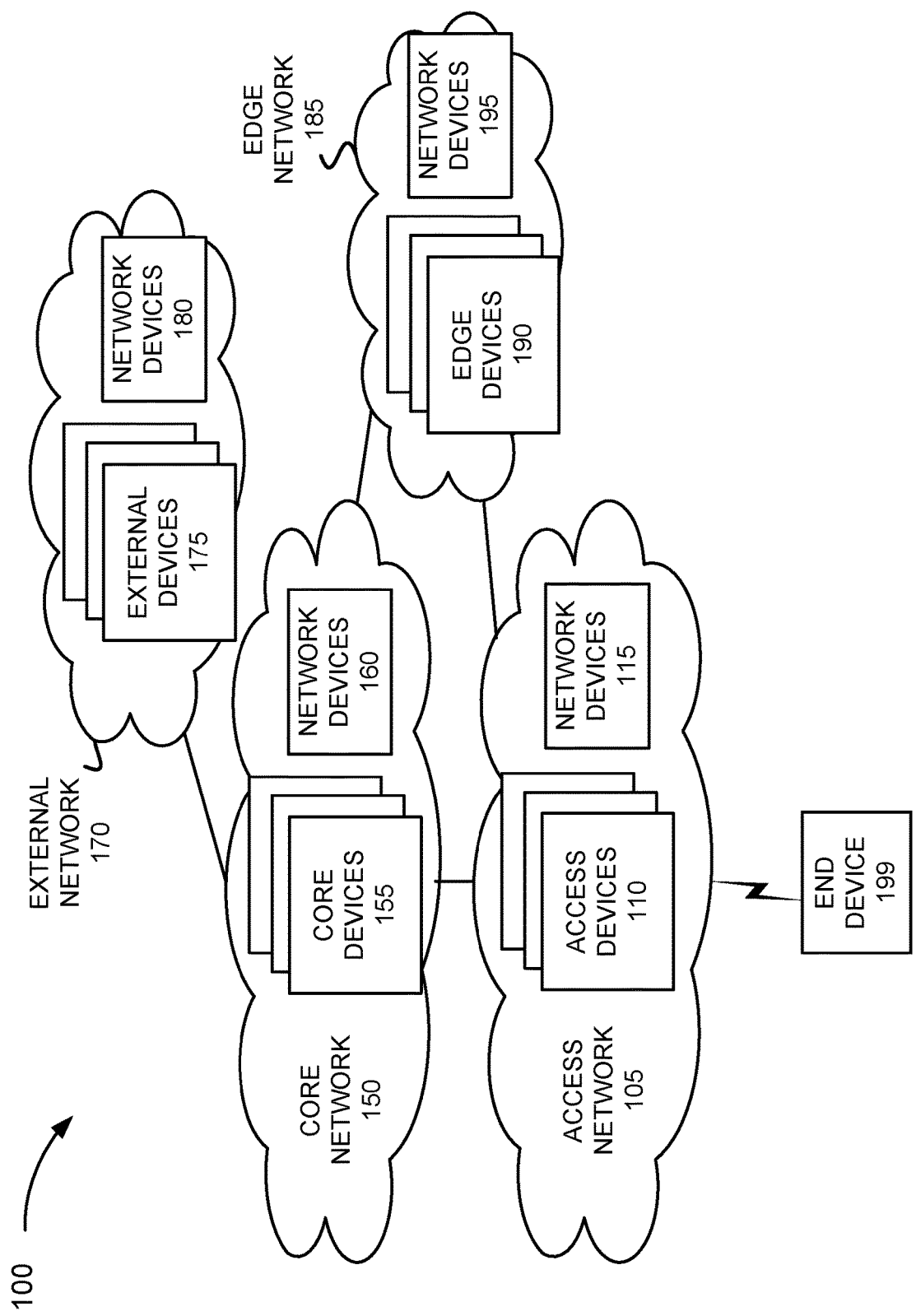
FIG. 1 is a diagram illustrating an exemplary environment in which an exemplary embodiment of a remote probing for failover service may be implemented.

The following detailed description refers to the accompanying drawings. The same reference numbers in different drawings may identify the same or similar elements. Also, the following detailed description does not limit the invention.

When a failover occurs in a network, user plane traffic and other traffic (e.g., control plane, etc.) may be moved or transferred from primary network devices (e.g., which failed) to secondary network devices. In a geographic-based failover design, the primary network devices and the corresponding secondary network devices may not be co-located. For example, the primary network devices may be located at one service aggregation point (SAP) or location and the secondary network devices may be located at another SAP or location. In this way, a service outage may be prevented based on the geographic redundancy. By way of further example, when a primary serving gateway (SGW) (or other type of network device) fails over, traffic may be routed to a secondary SGW (or other corresponding type of network device) based on inter-chassis session recovery (ICSR) configurations or other type of failover configurations.

Typically, the network also includes a network performance monitoring system that monitors various performance metrics and other aspects of the network (e.g., health, load balancing, end device access evaluation, etc.). In recognition of the failover design, the network performance monitoring system may reserve capacity for traffic that may be received during a failover. For example, an architecture for SGW probes (or other type of network device probes) may be configured such that each SGW probe of a location may reserve capacity for when an ICSR event occurs such that each SGW probe may monitor network performance for the failover traffic and the local traffic. However, the reservation of capacity to support failover traffic, by each network device probe, may yield inefficient use of network resources, particularly when the network device probe may be operational at the failover location and not disabled by the failure associated with the failover.

According to exemplary embodiments, a remote probing for failover service is described. According to an exemplary embodiment, the remote probing for failover service enables a network probe at a failover location to be used based on a failover-return routing configuration. According to some exemplary embodiments, the remote probing for failover service may pertain to a configuration that provides geographic redundancy, as described herein. According to other exemplary embodiments, the remote probing for failover service may pertain to a configuration that provides non-geographic redundancy, as described herein.

According to an exemplary embodiment, the remote probing for failover service includes a network device that provides the failover-return routing configuration. According to an exemplary embodiment, the network device is located at a standby location. According to an exemplary embodiment, the network device may receive failover traffic from a failure location, and may return the failover traffic to a network performance device of the failover location. In this way, network performance devices of both the failover location and the standby location may be utilized at all times. According to various exemplary embodiments, the remote probing for failover service may pertain to various types of traffic (e.g., user plane, control plane, etc.) and/or various types of network devices that may fail (e.g., access devices, core devices, application layer devices, etc.), as described herein.

As a result, the remote probing for failover service may more efficiently use network resources at a failover location when such network resources may not be directly impacted by a failover. Additionally, the remote probing for failover service may minimize or eliminate reservation of network resources associated with network probing and monitoring at a standby location for handling failover traffic.

FIG. 1 is a diagram illustrating an exemplary environment 100 in which an exemplary embodiment of the remote probing for failover service may be implemented. As illustrated, environment 100 includes an access network 105 a core network 150, an external network 170, and an edge network 185. Access network 105 includes access devices 110 and network devices 115, core network 150 includes core devices 155 and network devices 160, external network 170 includes external devices 175 and network devices 180, and edge network 185 includes edge devices 190 and network devices 195. Environment 100 further includes an end device 199.

The number, type, and arrangement of networks illustrated in environment 100 are exemplary. Additionally, or alternatively, other networks not illustrated in FIG. 1 may be included in environment 100, such as a backhaul/fronthaul network or another type of intermediary network, as described herein.

The number, the type, and the arrangement of network devices in access network 105, core network 150, external network, and edge network 185, as illustrated and described, are exemplary. The number of end devices 199 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the remote probing for failover service may use at least one of these planes of communication. Additionally, an interface of a network device may be modified in order to support the communication (e.g., transmission and reception of messages, information elements (IE), attribute value pairs (AVPs), etc.) between network devices and the remote probing for failover service logic, as described herein. According to various exemplary implementations, the interface of the network device may be a service-based interface or a reference point-based interface.

Access network 105 may include one or multiple networks of one or multiple types and technologies. For example, access network 105 may include a Fourth Generation (4G) RAN, a 4.5G RAN, a Fifth Generation (5G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), a Bluetooth network, a personal area network (PAN), or another type of network (e.g., a legacy Third Generation (3G) RAN, etc.) that may be considered a network edge. Additionally, or alternatively, access network 105 may include a wired network, an optical network, or another type of network that may provide an on-ramp to access devices 110 and/or core network 150.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technologies (RATs), etc.), wireless standards, wireless frequencies/bands/carriers (e.g., centimeter (cm) wave, millimeter (mm) wave, below 6 Gigahertz (GHz), above 6 GHz, licensed radio spectrum, unlicensed radio spectrum, etc.), and/or other attributes of radio communication.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a CU, a DU, a small cell node (e.g., a picocell device, a femtocell device, a microcell device, a home eNB, etc.), a future generation wireless access device, another type of wireless node (e.g., a WiFi device, a WiMax device, a hotspot device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. Access devices 110 may include wired and/or optical devices (e.g., modem, wired access point, optical access point, Ethernet device, etc.) that provide network access.

According to an exemplary embodiment, access network 105 may include network devices 115 that monitor and evaluate network performance in access network 105. For example, network devices 115 may monitor and evaluate various quality of service (QoS) metrics, key performance indicators (KPIs), service level agreement (SLA) parameters, and/or other types of performance criteria. According to various exemplary implementations, the monitoring and evaluating of network performance may include user plane traffic, control plane traffic, or both. According to an exemplary embodiment, access network 105 may include network devices 115 that provide and/or support the remote probing for failover service, as described herein.

Core network 150 may include one or multiple networks of one or multiple types and technologies. According to an exemplary embodiment, core network 150 includes a complementary network of access network 105. For example, core network 150 may be implemented to include an Evolved Packet Core (EPC) of an LTE network, an LTE-A network, an LTE-A Pro network, a next generation core (NGC) network, and/or a future generation network. Core network 150 may include a legacy core network.

Depending on the implementation, core network 150 may include various types of network devices, such as core devices 155. For example, core devices 155 may include a mobility management entity (MME), a packet gateway (PGW), a serving gateway (SGW), a home agent (HA), a GPRS support node (GGSN), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), a network data analytics function (NWDAF), a network exposure function (NEF), and/or an application function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein.

According to an exemplary embodiment, core network 150 may include network devices 160 that monitor and evaluate network performance in core network 150. For example, network devices 160 may monitor and evaluate various QoS metrics, KPIs, SLA parameters, and/or other types of performance criteria. According to various exemplary implementations, the monitoring and evaluating of network performance may include user plane traffic, control plane traffic, or both. According to an exemplary embodiment, core network 150 may include network devices 160 that provide and/or support the remote probing for failover service, as described herein.

External network 170 may include one or multiple networks. For example, external network 170 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, an Intranet, a private network, a public network, or other type of network that hosts an end device application or service.

Depending on the implementation, external network 170 may include various network devices, such as external devices 175. For example, external devices 175 may provide various applications, services, or other type of end device assets, such as servers (e.g., web, application, cloud, etc.), mass storage devices, data center devices, and/or other types of network devices pertaining to various network-related functions.

According to an exemplary embodiment, external network 170 may include network devices 180 that monitor and evaluate network performance in external network 170. For example, network devices 180 may monitor and evaluate various QoS metrics, KPIs, SLA parameters, and/or other types of performance criteria. According to various exemplary implementations, the monitoring and evaluating of network performance may include user plane traffic, control plane traffic, or both. According to an exemplary embodiment, external network 170 may include network devices 180 that provide and/or support the remote probing for failover service, as described herein.

Edge network 185 includes a platform that provides an application service. For example, edge network 185 may be a multi-access edge computing (MEC) (also known as mobile edge computing (MEC)) or other type of edge network (e.g., fog network, etc.) Edge network 185 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology.

Depending on the implementation, edge network 185 may include various types of network devices that are illustrated in FIG. 1 as edge devices 190. For example, edge devices 190 may include virtualized network functions (VNFs), multi-access (MA) applications/services, and/or servers. Edge devices 190 may provide various end device and user device applications or services (referred to as application services). For example, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality, etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), and/or broadcast-like services.

Edge devices 190 may also include other network devices that support its operation, such as, for example, an orchestrator (e.g., a network function virtualization orchestrator (NFVO), a mobile edge (ME) orchestrator, etc.), an edge manager (e.g., a virtualized infrastructure manager (VIM), a virtual network function manager (VNFM), an ME platform manager), an operations support system (OSS), a local domain name system (DNS), registries, and/or other types of network devices (e.g., routers, core devices 155 (e.g., a user plane function (UPF), etc.), an ingress device, a load balancer, etc.), and network resources (e.g., storage devices, communication links, local access data network (LADN), etc.).

According to an exemplary embodiment, edge network 185 may include network devices 195 that monitor and evaluate network performance in edge network 185. For example, network devices 195 may monitor and evaluate various QoS metrics, KPIs, SLA parameters, and/or other types of performance criteria. According to various exemplary implementations, the monitoring and evaluating of network performance may include user plane traffic, control plane traffic, or both. According to an exemplary embodiment, edge network 185 may include network devices 195 that provide and/or support the remote probing for failover service, as described herein.

End device 199 includes a device that has computational and communicative capabilities (e.g., wired, wireless, optical, etc.). Depending on the implementation, end device 199 may be a mobile device, a portable device, a stationary device, a device operated by a user, or a device not operated by a user. For example, end device 199 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, an autonomous device, a smart device, or other types of wireless end nodes. By way of further example, end device 199 may be implemented as a smartphone, a personal digital assistant, a tablet, a netbook, a phablet, a wearable device (e.g., a watch, glasses, etc.), customer premise equipment (e.g., a set top box, etc.), a streaming player device, an infotainment system in a vehicle, a vehicle support system, a smart television, a global positioning device, a drone, a game system, a music playing system, or other types of wireless, wired, and/or optical devices. End device 199 may be configured to execute various types of software (e.g., applications, programs, etc.). The number and the types of software may vary among end devices 199.

End device 199 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, end device 199 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 199 may vary among end devices 199.

Figure 2:
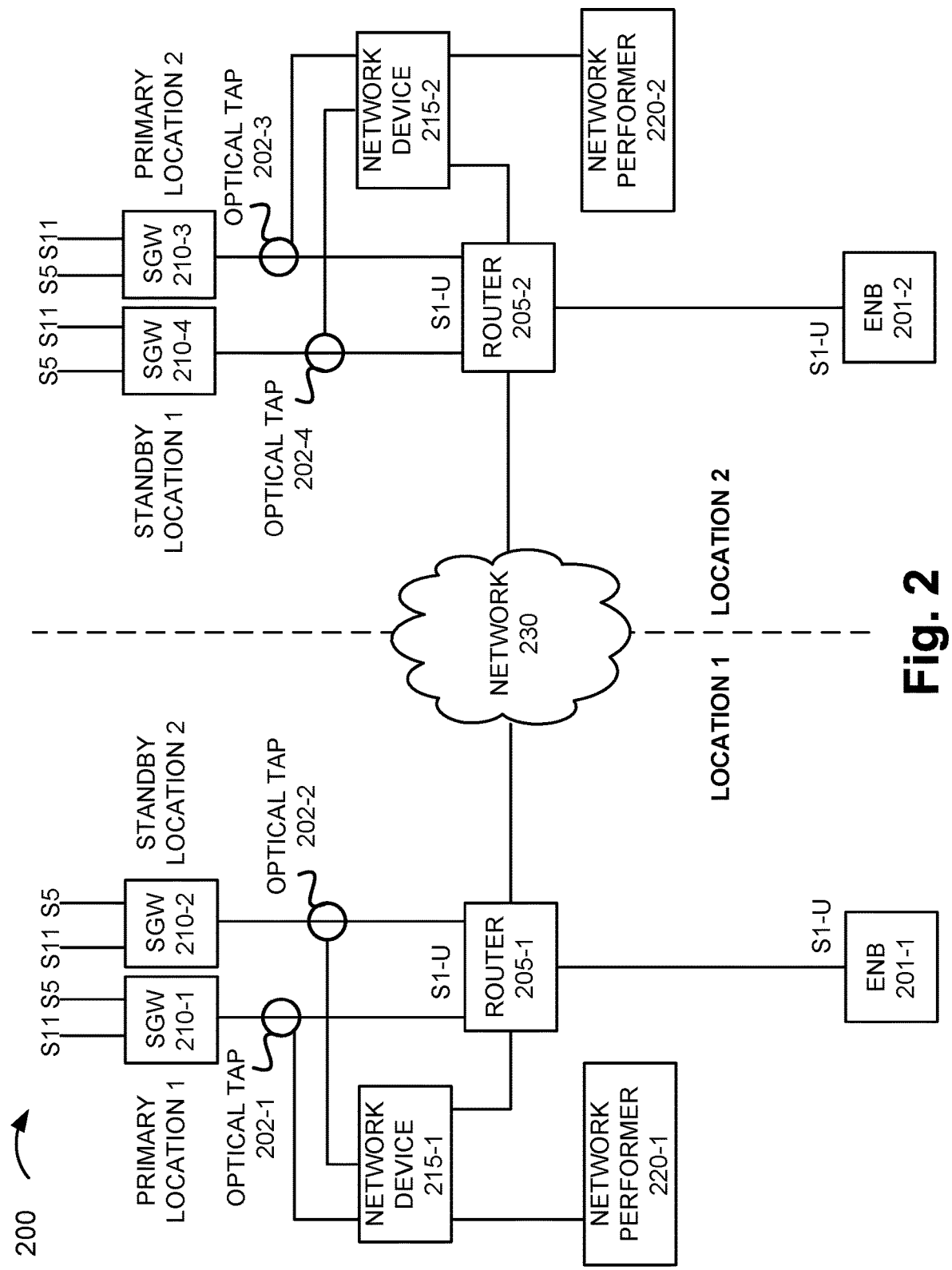
FIG. 2 is a diagrams illustrating another exemplary environment in which an exemplary embodiment of the remote probing for failover service.

FIG. 2 is a diagram illustrating an exemplary environment 200 in which an exemplary embodiment of the remote probing for failover service may be implemented. As illustrated, environment 200 includes a location 1 and a location 2 that are configured to provide a geographic redundancy service. Locations 1 and 2 may include similar access devices 110 and core devices 155. For example, access devices 110 may include eNBs 201-1 and 201-2 (also referred to as eNBs 201, and generally or individually as eNB 201), and core devices 155 may include SGWs 210-1 through 210-4 (also referred to as SGWs 210, and individually or generally as SGW 210).

Additionally, as illustrated, environment 200 includes optical taps 202-1 through 202-4 (also referred to as optical taps 202, and individually or generally as optical tap 202), routers 205-1 and 205-2 (also referred to as routers 205, and individually or generally as router 205), network devices 215-1 and 215-2 (also referred to as network devices 215, and individually or generally as network device 215), and network performers 220-1 and 220-2 (also referred to as network performers 220, and individually or generally as network performer 220). Environment 200 also includes a network 230 that provides communication between location 1 and location 2.

According to other exemplary embodiments, access device 110 of access network 105 and/or core device 155 of core network 150 may be a different type of network device, such as the various types of access devices 110 (e.g., gNB, eLTE eNB, etc.) and core devices 155 (e.g., UPF, PGW, MME, SMF, AMF, etc.), as described herein. Additionally, or alternatively, the remote probing service for failover may pertain to application service layer networks (e.g., external network 170, edge network 185) and devices (e.g., external devices 175, edge devices 190), communication links between access network 105 and edge network 185, between core network 150 and external network 170, intermediary networks and devices, and so forth.

The number and arrangement of access devices 110 and core device 155 are exemplary. Additionally, the number, the type, and the arrangement of communication links and interfaces illustrated in environment 200 are exemplary.

Also, according to other exemplary embodiments, one or more functions and/or processes described as being performed by a particular device may be performed by a different device, or some combination of devices, which may or may not include the particular device. Additionally, a single network device, as illustrated in FIG. 2, may be implemented as multiple network devices (e.g., different functions may be implemented as multiple network devices, etc.) and/or multiple network devices may be implemented as a single network device.

eNB 201 includes a network device that provides radio access to end device 199. For example, eNB 201 may operate and provide various functions in accordance with a wireless standard (e.g., Third Generation Partnership Project (3GPP), International Telecommunication Union (ITU), European Telecommunications Standards Institute (ETSI), etc.) and/or a proprietary configuration associated with an E-UTRAN. eNB 201 may include an S1-U interface for communicating user plane traffic with SGW 210.

Optical tap 202 may include a device that extracts an optical signal from an optical fiber without breaking the connection. According to other exemplary implementations, depending on the type of communication link, other types of taps or devices may be used to extract, duplicate, split, and/or obtain a signal, in whole or in part, from the communication link. Additionally, according to other exemplary implementations, optical tap 202 may be situated to obtain signals from traffic other than user plane traffic, such as control plane traffic (e.g., associated with S11 interface or other interface of access network 105 and/or core network 150).

Router 205 includes a network device that provides a failover service. For example, router 205 may detect or be informed from another network device (not illustrated) when SGW 210 fails (e.g., a hardware failure, a software failure, a interface card failure, etc.) or a communication link fails (e.g., severed, link flap, etc.) that may prevent user plane traffic from reaching SGW 210 (referred to hereinafter as an SGW failure). Router 205 may detect or be informed of the SGW failure based on various fault detection methodologies, such as failure to receive ping messages from SGW 210 (e.g., hello messages, etc.), log data analysis, a link monitoring system (e.g. physical, virtual, logical), network analyzers and tools, and/or other types of device and link failure probing systems. Router 205 may be configured to route or forward failover traffic to a standby location (e.g., location 1 or location 2) via network 230 in response to the detection or being informed of the SGW failure, as described herein.

Router 205 further includes a network device that provides the remote probing for failover service. For example, router 205 may be configured to route or forward failover traffic received from the standby location to network device 215 of the failover location, as described herein.

SGW 210 includes a network device that provides routing, GPRS Tunneling Protocol (GTP) support, and charging functions. For example, SGW 210 may operate and provide various functions in accordance with a wireless standard (e.g., 3GPP, ITU, ETSI, etc.) and/or a proprietary configuration associated with an EPC. SGW 210 may include an S1-U interface for communicating user plane traffic with eNB 201, an S5 interface to communicate with a PGW (not illustrated), and an S11 interface to communicate with an MME (not illustrated).

Network device 215 may include a network device that provides a probing service. For example, network device 215 may receive tapped traffic from a primary optical tap 202. According to an exemplary implementation, when the tapped traffic (e.g., at optical tap 202-1 at location 1 or optical tap 202-3 at location 2) is destined to the primary SGW of a location (e.g., SGW 210-1 at location 1 or SGW 210-3 at location 2) and there is no failover, network device 215 routes or forwards the tapped traffic to network performer 220.

Network device 215 may further include a network device that provides a remote probing for failover service. For example, network device 215 may receive tapped traffic from a standby optical tap 202. According to an exemplary implementation, when the tapped traffic (e.g., at optical tap 202-2 at location 1 or optical tap 202-4 at location 2) is destined to the standby SGW of a location (e.g., SGW-210-2 at location 1 or SGW 210-4 at location 2) due to a failover, network device 215 of the standby location routes or forwards the tapped traffic back to network device 215 of the primary location. Network device 215 may provide the tapped traffic to network performer 220. For example, network device 215-1 of location 1 may receive failover traffic via optical tap 202-2, and may forward or route the failover traffic back to network device 215-2 of location 2, which is where the failover occurred. Network device 215-2 may provide the failover traffic to network performer 220-2. According to an exemplary embodiment, network device 215 may use tunneling for forwarding or routing traffic to another network device 215. For example, network device 215 may use Generic Routing Encapsulation (GRE) tunneling for transmission of failover traffic to another network device 215.

Network performer 220 may receive and analyze traffic received and/or transmitted by, and/or destined to SGW 210. For example, network performer 220 may analyze performance metric information relating to user plane traffic, such as latency, packet error rate, packet drop rate, reliability, bit rates (e.g., guaranteed, maximum, minimum, average, etc.), throughput, jitter, traffic class, round trip time (RTT), and/or other quality of service (QoS), service level agreement (SLA), key performance indicators (KPIs), Quality of Experience (QoE) parameters and values. Network performer 220 may analyze control plane traffic pertaining to security, routing, load balancing, auto-scaling, latency associated with control plane procedures (e.g., handover, session or service establishment, etc.), and/or other types of metric information. According to some exemplary embodiments, network performer 220 may include logic that identifies and isolates traffic associated with end device 199 from the tapped traffic. For example, network performer 220 may use an end device identifier (e.g., an international mobile subscriber identity (IMSI) or other type of identifier) and other information (e.g., tunneling information, bearer information, etc.) that correlate to end device 199 and a session of end device 199. According to other exemplary embodiments, network device 215 may perform this task, and forward or route the isolated traffic to network performer 220 for further network performance evaluation.

Network 230 may include a network of one or multiple types and/or technologies. For example, network 230 may include a transport network, an Internet Protocol (IP) network, a data network, or other suitable network.

Figure 3A:
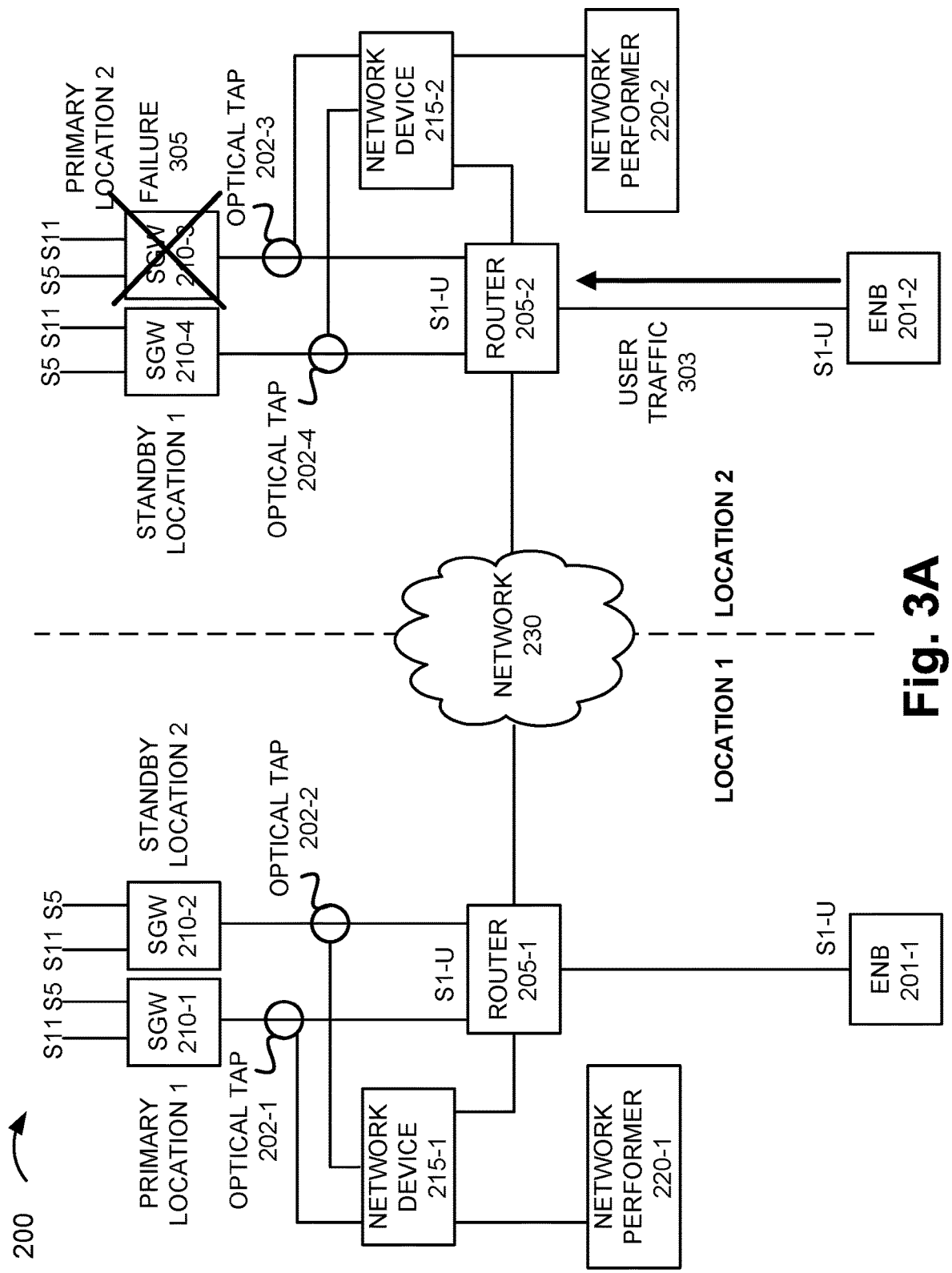

FIGS. 3A-3G are diagrams illustrating an exemplary embodiment of a process pertaining to the remote probing for failover service. Referring to FIG. 3A, assume user plane traffic 303 is transmitted from eNB 201-2 to (primary) SGW 210-3 via router 205-2. Thereafter, a failure 305 occurs at SGW 210-3 (illustrated as an X in FIG. 3A). According to various exemplary scenarios, the failover may be intentional or unintentional. For example, the intentional failover may relate to an upgrade, maintenance, a reboot, or trouble shooting of SGW 210-3. Alternatively, for example, an unintentional failover may relate to hardware, software, and/or other type of component breakdown of SGW 210-3, loss of power, or another type of unexpected reason.

Figure 3B:
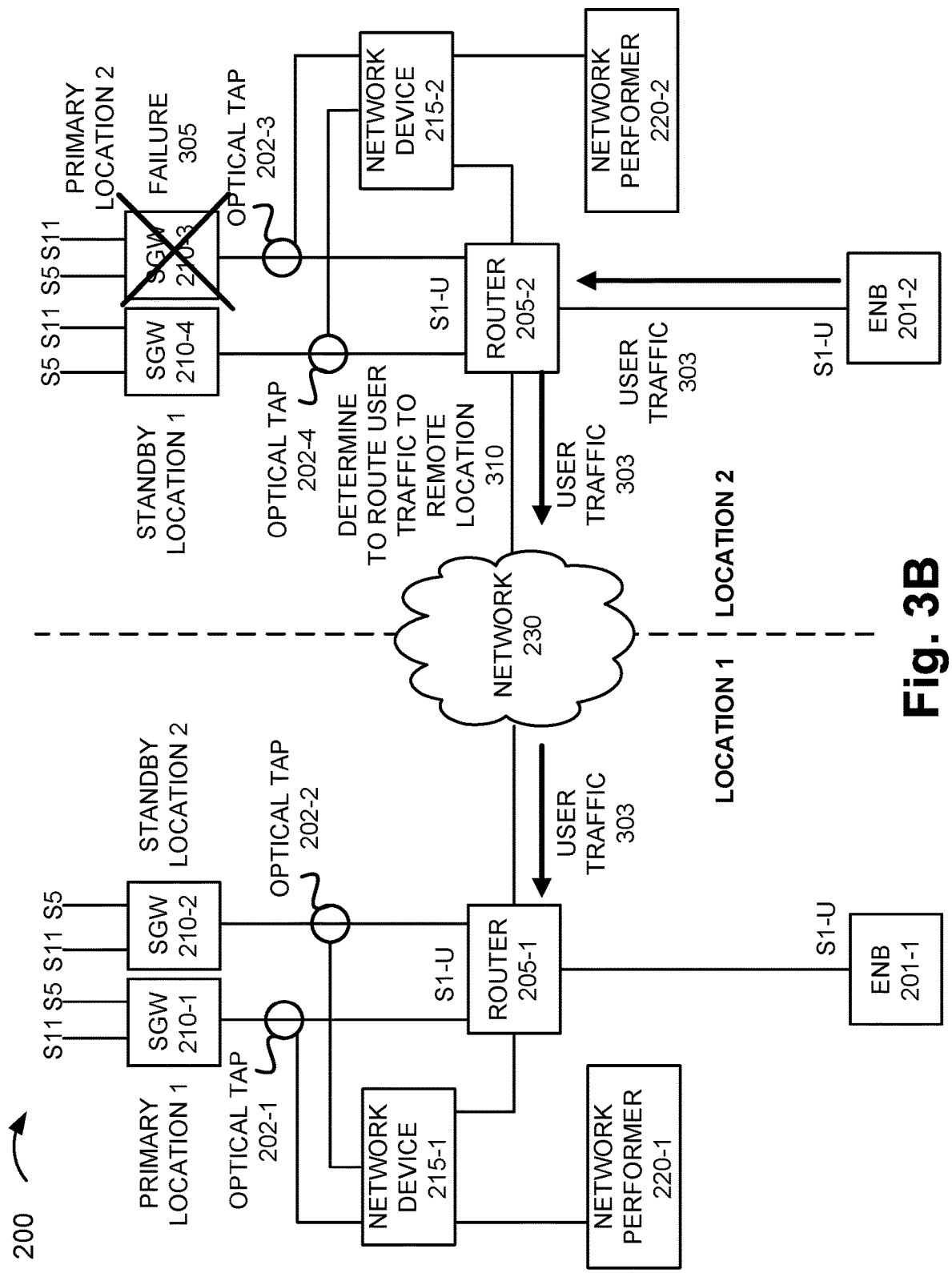

Referring to FIG. 3B, based on the occurrence of the failure, router 205-2 may determine to forward the user traffic to remote location 310. For example, router 205-2 may detect or be informed (e.g., by another network device (not illustrated)) about the SGW failure. Router 205-2 may forward or route user traffic 303 to router 205-1 of location 1 via network 230. According to some exemplary implementations, primary SGW 210-3 and standby SGW 210-2 may be assigned the same virtual Internet Protocol (VIP) address. Similarly, primary SGW 210-1 and standby SGW 210-4 may be assigned the same VIP address.

Figure 3C:
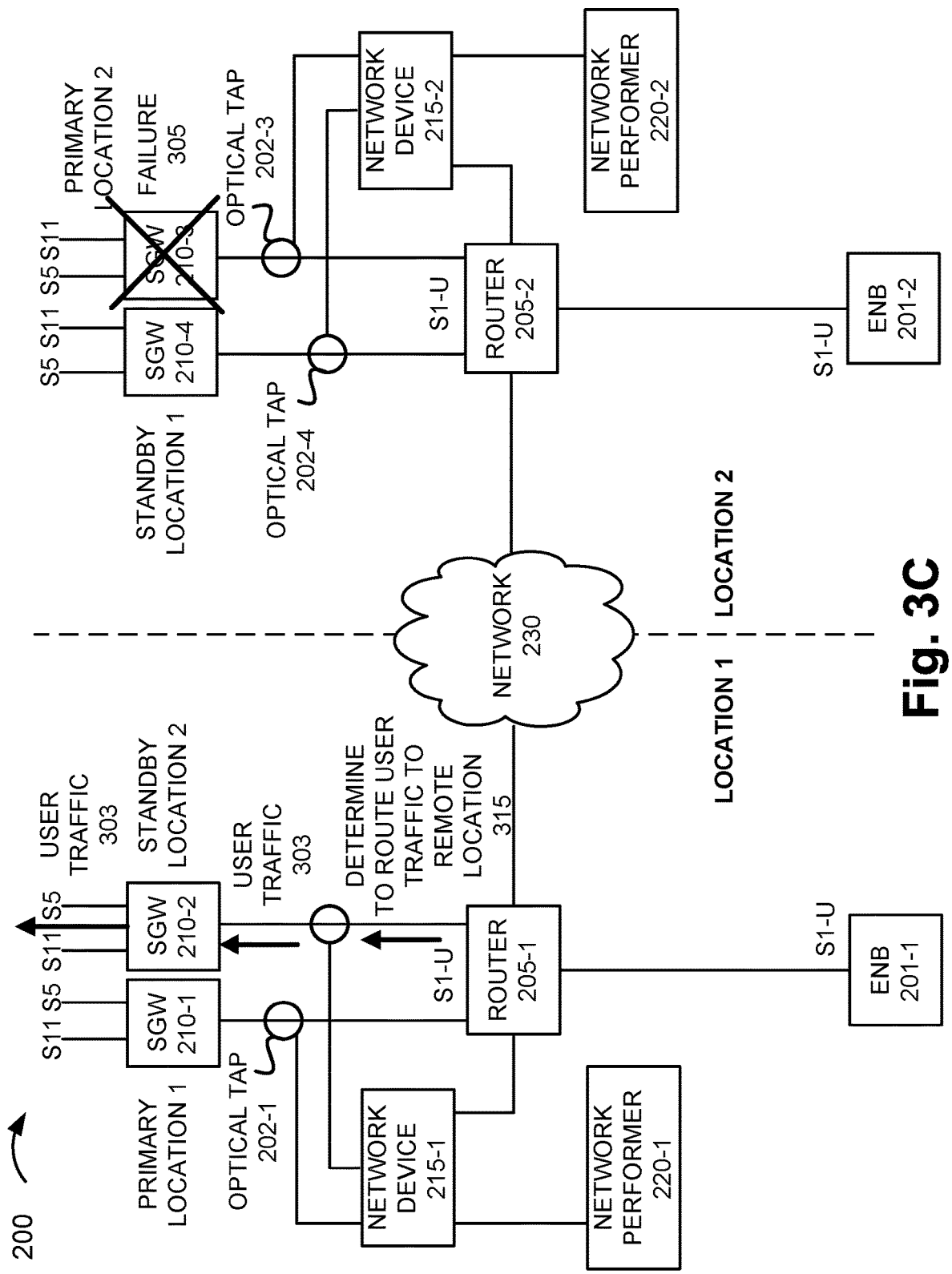
Figure 3D:
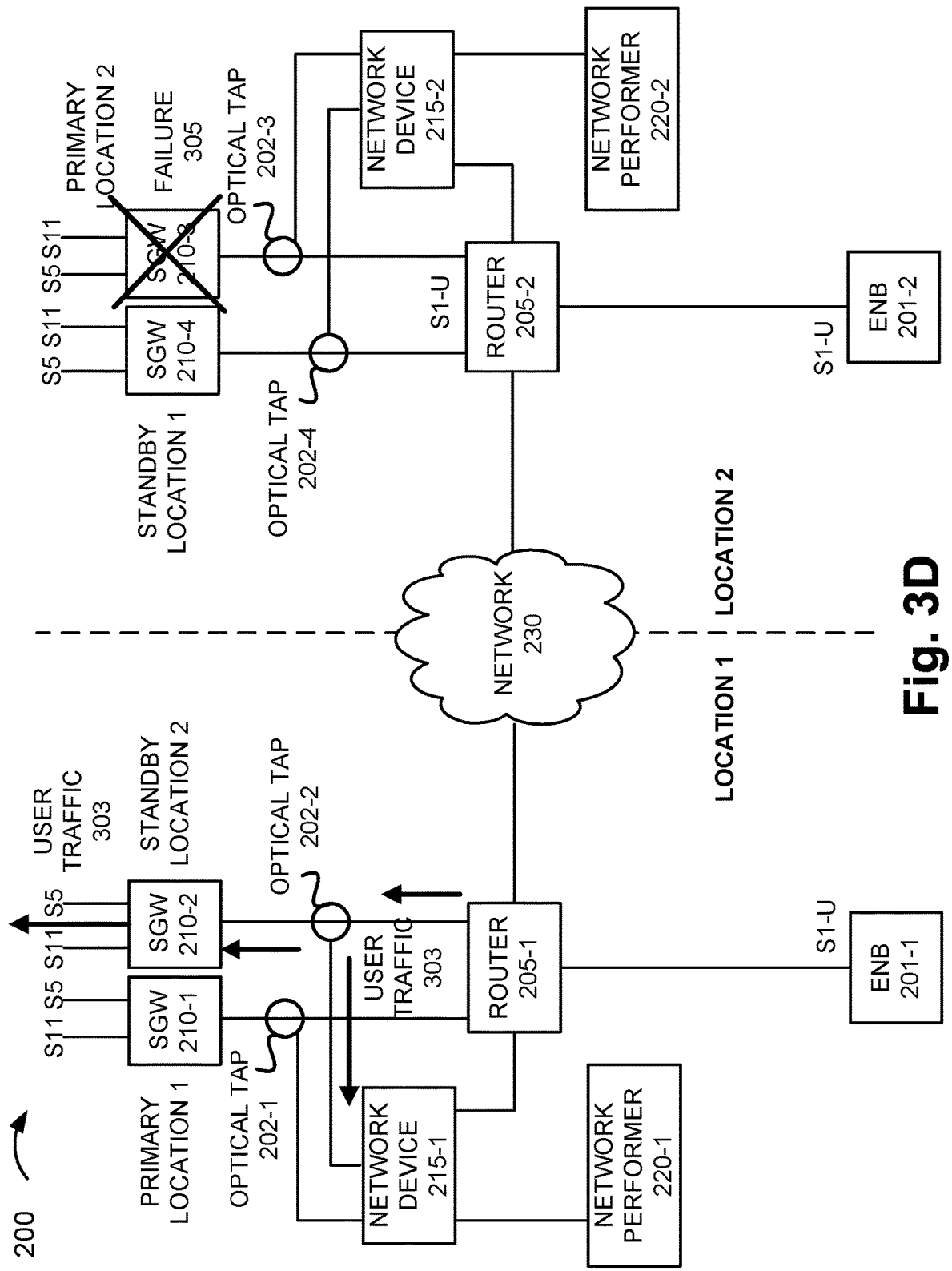
Figure 3E:
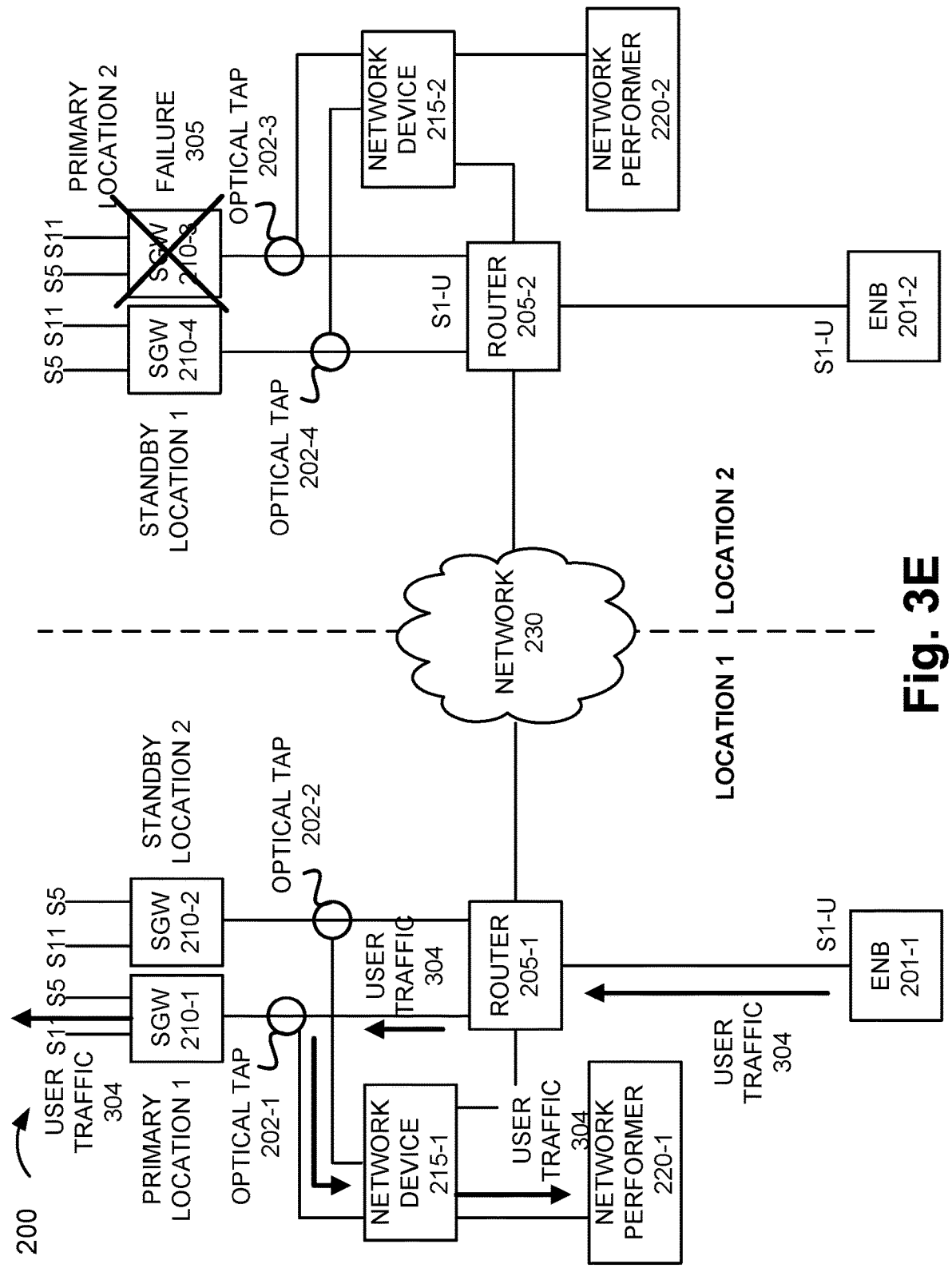

Referring to FIG. 3C, in response to receiving user traffic 305, router 205-1 may determine to forward the failed-over user traffic to a standby SGW 315. For example, router 205-1 may forward or route user traffic 303 to SGW 210-2, which may subsequently be routed or forwarded via the S5 interface of SGW 210-2 to a PGW (not illustrated). Referring to FIG. 3D, user traffic 303 may be tapped by optical tap 202-2, and received by network device 215-1. Based on the receipt of user traffic 303 via optical tap 202-2 (and the standby communication link between router 205-1 and SGW 210-2), network device 215-1 may determine that user traffic 303 is failover traffic. This is in contrast to network device 215-1 receiving user traffic via optical tap 202-1 (and the primary communication link between router 205-1 and SGW 210-1). For example, referring to FIG. 3E, a user traffic 304 originating from location 1, may propagate via router 205-1 to SGW 210-1, and onward to a PGW, for example. Additionally, user traffic 304 tapped by optical tap 202-1 may be deemed normal or non-failover traffic by network device 215-1. As such, network device 215-1 may forward or route user traffic 304 to network performer 220-1. Network performer 220-1 may perform network performance evaluation on user traffic 304.

Referring to FIG. 3F and the initial exemplary scenario, network device 215-1 may determine to route the user traffic to the failed location 320. For example, network device 215-1 may determine to route or forward the user traffic to network device 215-2. According to an exemplary implementation, network devices 215 may communicate failed over traffic via tunneling (e.g., GRE tunnel, etc.), as previously described.

Referring to FIG. 3G, in response to receiving the user traffic from network device 215-1, network device 215-2 of location 2 may determine to route the user traffic to network performer 325. For example, as illustrated, network device 215-2 may forward or route the user traffic to network performer 220-2. In response to receiving the user traffic, network performer 220-2 may perform network analysis 330 on the user traffic.

FIGS. 3A-3G illustrate an exemplary process of the remote probing for failover service, according to other exemplary embodiments, the process may include additional, different, and/or fewer steps. For example, the remote probing for failover service may relate to control plane data. Additionally, or alternatively, network device 215 may forward or route traffic to a network device different from network performer 220.

Figure 4:
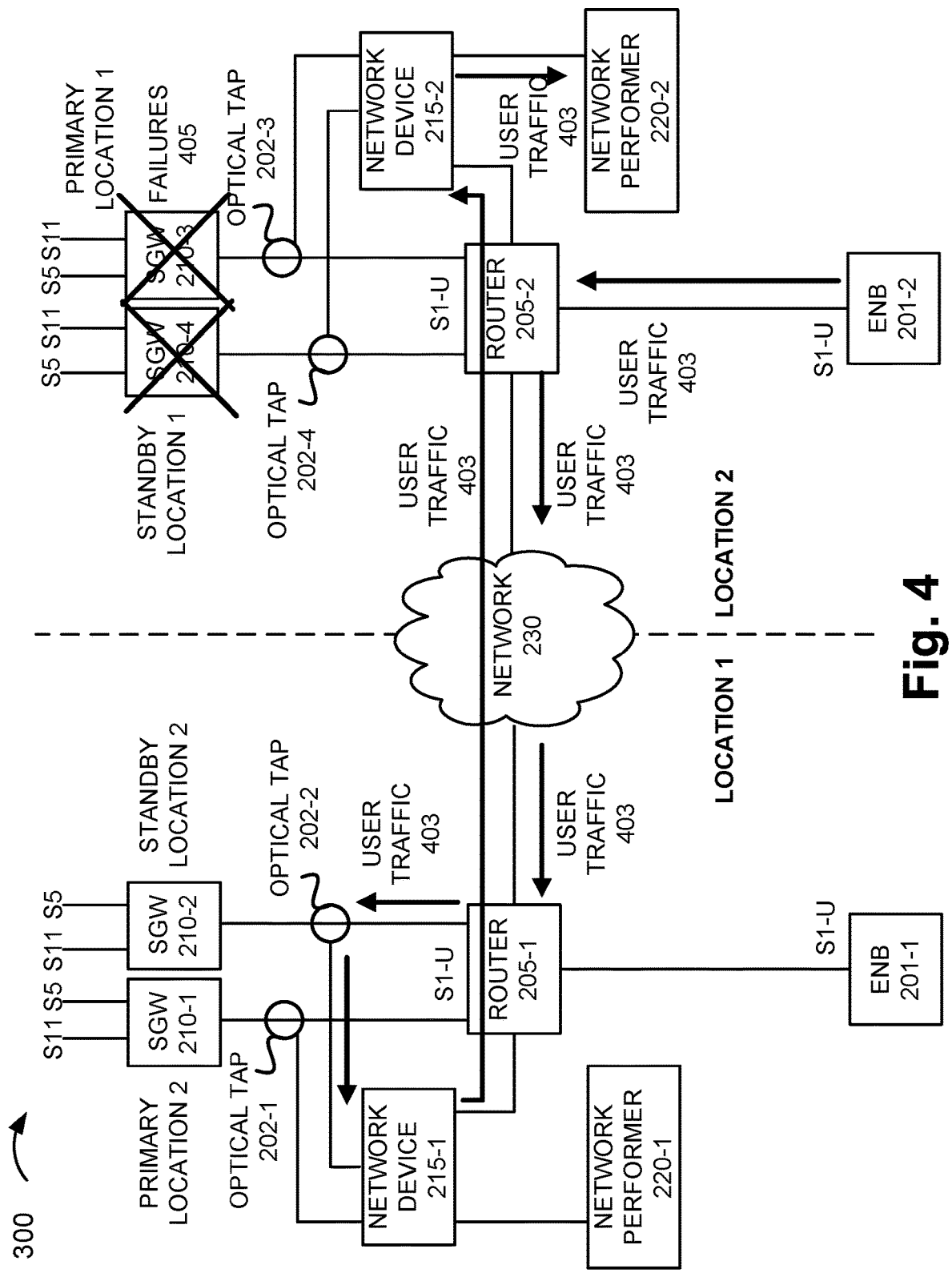
FIG. 4 is a diagram illustrating another exemplary process of an exemplary embodiment of the remote probing for failover service.

As previously described, the remote probing for failover service may pertain to a non-geographic failover configuration. For example, referring to FIG. 4, assume that SGWs 210-1 and 210-2 are co-located and are primary and standby SGWs for location 1, and similarly SGWs 210-3 and 210-4 are co-located and are primary and standby SGWs for location 2. This is in contrast to environment 200. According to an exemplary scenario in an exemplary environment 300, assume failures 405 occur for both SGWs 210-3 and 210-4. In manner similar to that previously described, router 205-2 may determine that a catastrophic SGW failure occurred, and forward or route a user traffic 403 to router 205-1. Router 205-1 may forward or route user traffic 403 on the standby link, and network device 215-1 may receive the user traffic via optical tap 202-2. Although not illustrated, user traffic 403 may be received by SGW 210-2. As further illustrated, network device 215-1 may route or tunnel the user traffic to network device 215-2, and network device 215-2 may route or forward the user traffic to network performer 220-2.

Figure 5:
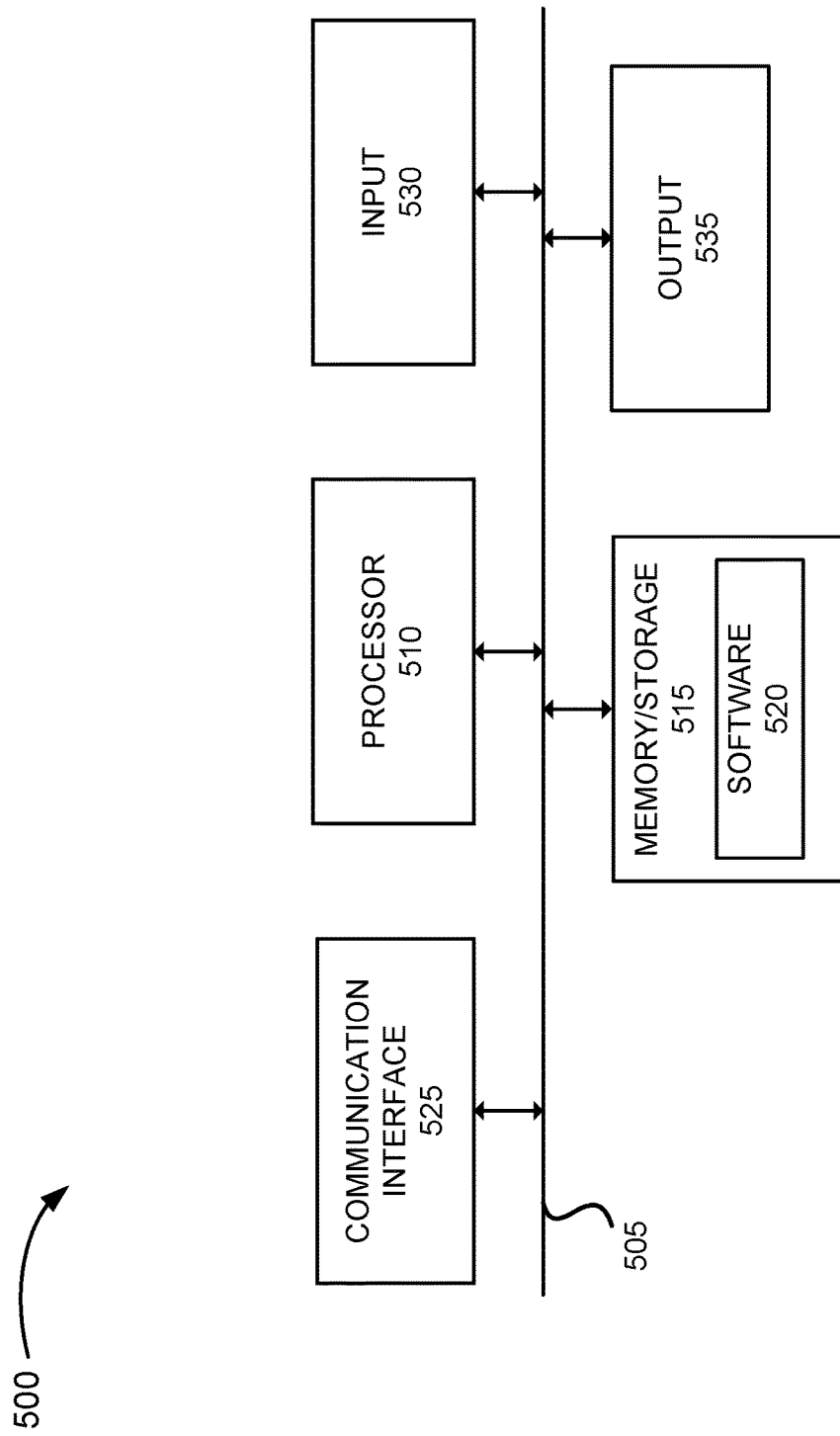
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to components included in access devices 110, core devices 155, end device 199, router 205, SGW 210, network device 215, and network performer 220. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, graphics processing units (GPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of an operation performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a content addressable memory (CAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory (e.g., high bandwidth memory (HBM), stacked memory, hybrid memory, etc.). Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with respect to network device 215, software 520 may include an application that, when executed by processor 510, provides a function of the remote probing for failover service, as described herein. Additionally, with reference to router 205, software 520 may include an application that, when executed by processor 510, provides a function of a failover service, as described herein. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces, wired interfaces, and/or optical interfaces. Communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.), a network interface card, a port, and/or other type of communication element. Communication interface 525 may be implemented as a point-to-point interface, a service based interface, etc.

Input 530 permits an input into device 500. For example, input 530 may include a keyboard, a mouse, a display, a touchscreen, a touchless screen, a button, a switch, an input port, speech recognition logic, a microphone, an image and/or video capture device, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 500 may be implemented in the same manner. For example, device 500 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a public/private cloud or other type of network.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process and/or a function, as described herein based on the execution of hardware (processor 510, etc.).

Figure 6:
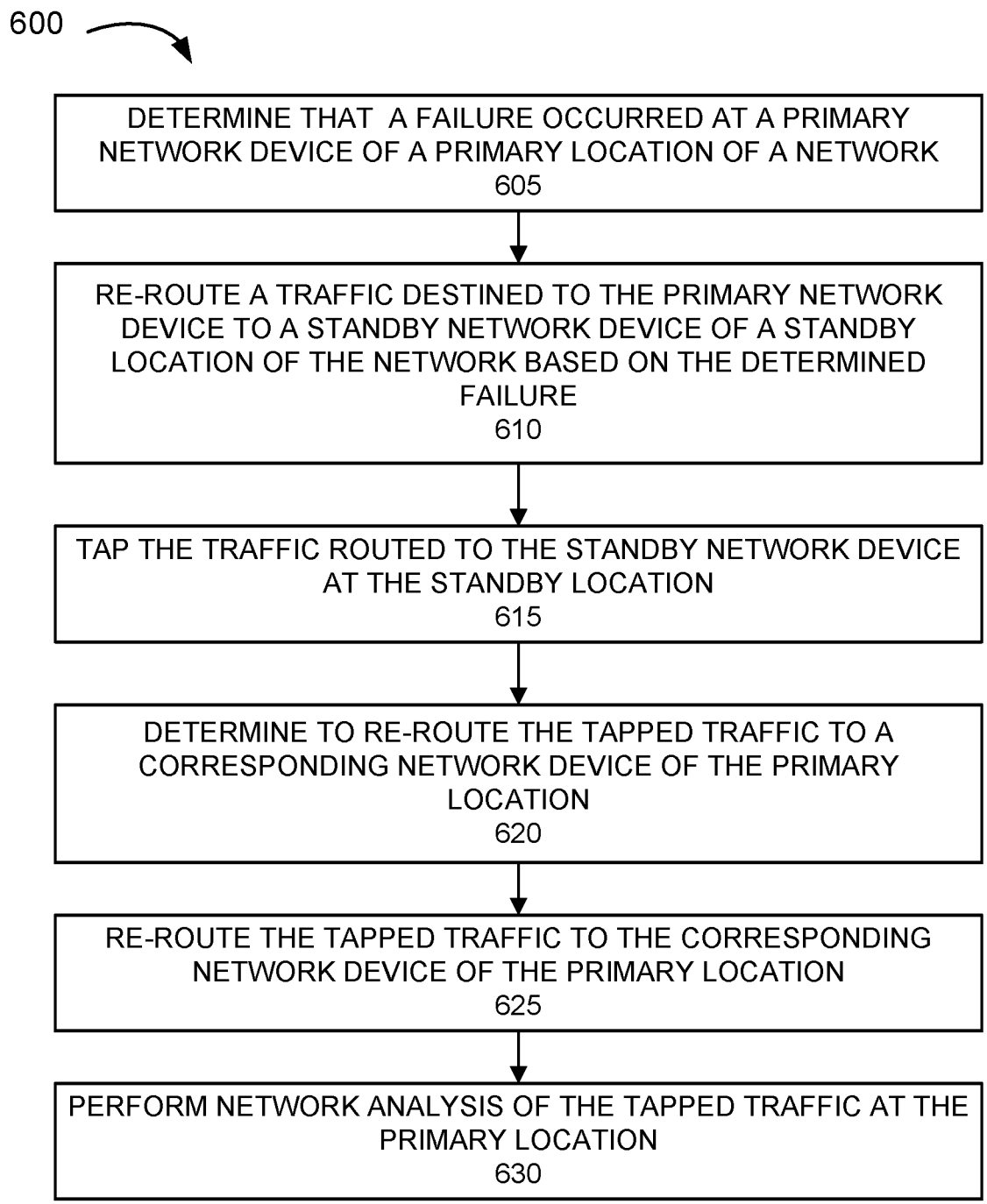
FIG. 6 is a flow diagram illustrating exemplary processes of an exemplary embodiment of the remote probing for failover service.

FIG. 6 is a flow diagram illustrating an exemplary process 600 of an exemplary embodiment of the remote probing for failover service. According to an exemplary embodiment, a network device performs steps of process 600. Additionally, for example, processor 510 may execute software 520 to perform a step illustrated in FIG. 6 and described herein. Additionally, or alternatively, a step illustrated in FIG. 6 may be performed by execution of only hardware. According to an exemplary embodiment, process 600 may be performed in a geographic redundant network environment associated with a failover service.

In block 605, it may be determined that a failure occurred at a primary network device situated in a primary location of a network. For example, router 205 (or other suitable network device) may detect or be informed that a failure occurred at an access device 110, a core device 155, external device 175, edge device 190, and/or a communication link to or from access device 110, core device 155, external device 175, edge device 190 of the network.

In block 610, traffic destined to the primary network device may be re-routed to a standby network device situated in a standby location of the network based on the determined failure. For example, router 205 (or other suitable network device) may re-route the traffic to another access device 110, core device 155, external device 175, or edge device 190 situated in the standby location. By way of further example, router 205-2 may route the failover traffic to router 205-1 via network 230, and in turn, router 205-1 may route the failover traffic to SGW 210-2.

In block 615, the traffic to the standby network device may be tapped at the standby location. For example, network device 215 at the standby location may tap the traffic to the other access device 110, the other core device 155, the other external device 175, or the other edge device 190 via optical tap 202 (or other suitable device depending on the communication link).

In block 620, it may be determined to re-route the tapped traffic to a corresponding network device of the primary location. For example, network device 215 at the standby location may determine to re-route the tapped traffic to network device 215 at the primary location. Network device 215 at the standby location may make this determination based on the communication link (e.g., standby) from which the tapped traffic was obtained.

In block 625, the tapped traffic may be re-routed to the corresponding network device of the primary location. For example, network device 215 at the standby location may re-route the tapped traffic to network device 215 at the primary location.

In block 630, network analysis of the tapped traffic may be performed at the primary location. For example, network device 215 at the primary location may receive the tapped traffic and forward or route the tapped traffic to network performer 220. Network performer 220 may analyze the tapped traffic in relation to network performance.

FIG. 6 illustrates an exemplary process 600 of the remote probing for failover service, however, according to other embodiments, process 600 may include additional operations, fewer operations, and/or different operations than those illustrated in FIG. 6, and described herein.

Figure 7:
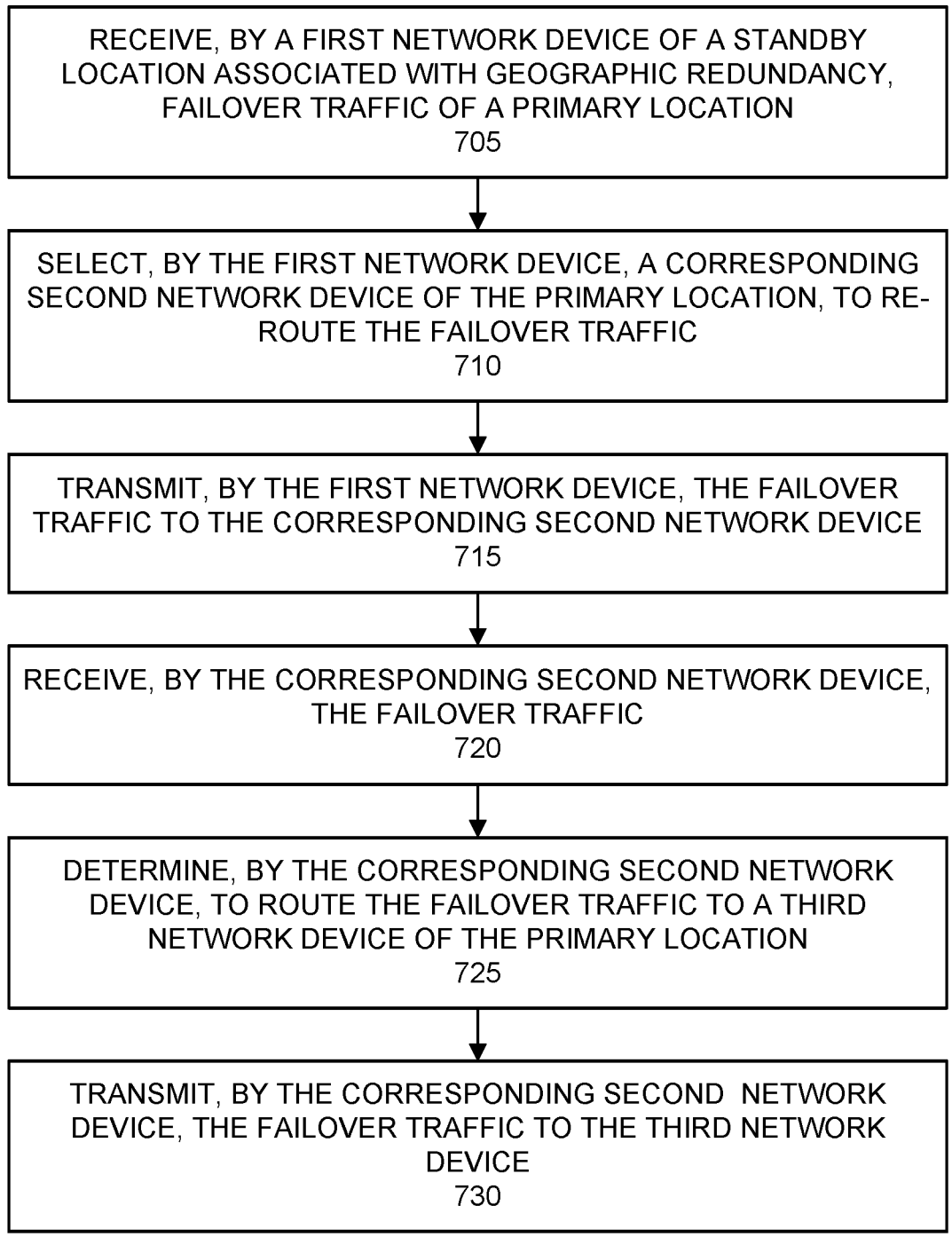
FIG. 7 is a flow diagram illustrating another exemplary process of an exemplary embodiment of the remote probing for failover service.

FIG. 7 is a flow diagram illustrating an exemplary process 700 of an exemplary embodiment of the remote probing for failover service. According to an exemplary embodiment, a network device performs steps of process 700. Additionally, for example, processor 510 may execute software 520 to perform a step illustrated in FIG. 7 and described herein. Additionally, or alternatively, a step illustrated in FIG. 7 may be performed by execution of only hardware. According to an exemplary embodiment, process 700 may be performed in a geographic redundant network environment associated with a failover service.

In block 705, a first network device of a standby location associated with geographic redundancy, may receive failover traffic from a primary location. For example, network device 215 of the standby location may receive failover traffic pertaining to the primary location.

In block 710, the first network device may select a corresponding second network device of the primary location to which to reroute the failover traffic. For example, network device 215 of the standby location may select network device 215 of the primary location to which to reroute the failover traffic. Network device 215 of the standby location may make the selection based on a geographic redundancy configuration. The geographic redundancy configuration may include, for example, identification of the communication link from which the failover traffic was received. Additionally, for the example, the identification may be correlated to a communication interface via which such received traffic is to be transmitted to the corresponding second network device.

In block 715, the first network device may transmit the failover traffic to the corresponding second network device. For example, network device 215 of the standby location may transmit the failover traffic to network device 215 of the primary location. The failover traffic may be transmitted via a GRE tunnel. Alternatively, the failover traffic without the GRE tunnel.

In block 720, the corresponding second network device may receive the failover traffic. For example, network device 215 of the primary location may receive the failover traffic.

In block 725, the corresponding second network device may determine to route the failover traffic to a third network device of the primary location. For example, network device 215 of the primary location may determine to route the failover traffic to network performer 220. Network device 215 of the primary location may make this determination based on the source address associated with network device 215 of the standby location, the communication interface via which the failover traffic was received, and/or some other configuration.

In block 730, the corresponding second network device may transmit the failover traffic to the third network device. For example, network device 215 of the primary location may transmit the failover traffic to network performer 220. Network performer 220 may analyze the failover traffic for network performance and/or other network-related criteria.

FIG. 7 illustrates an exemplary process 700 of the remote probing for failover service, however, according to other embodiments, process 700 may include additional operations, fewer operations, and/or different operations than those illustrated in FIG. 7, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to processes illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single or multiple physical memory or storage devices that reside in or is accessible to one or multiple devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    receiving, by a first network device of a first core network at a standby location associated with a geographic redundancy via a standby communication link and an intermediary network between a first network, which includes the first core network, and a second network at a primary location, failover traffic that includes user plane traffic originating from the primary location associated with a failure of a network device of the second network, and the failover traffic is concurrently forwarded to a third network, which hosts an application service to which the failover traffic pertains, without traversing the second network and via the first core network;
    selecting, by the first network device, a second network device at the primary location to which to transmit the failover traffic based on receiving the failover traffic via the standby communication link; and
    transmitting, by the first network device, the failover traffic to the second network device based on the selecting of the second network device.

2. The method of claim 1, further comprising:
    receiving, by the second network device, the failover traffic;
    transmitting, by the second network device the failover traffic, to a third network device at the primary location;
    receiving, by the third network device, the failover traffic; and
    performing, by the third network device in response to receiving the failover traffic, network performance evaluation on the failover traffic.

3. The method of claim 1, wherein the failover traffic received by the first network device includes tapped user plane traffic received via an optical tap device located at the standby location.

4. The method of claim 1, wherein the network device is a core network device of a second core network and the second network at the primary location.

5. The method of claim 1, wherein the standby communication link communicates the failover traffic to a network device at the standby location that corresponds to the network device of the second network at the primary location.

6. The method of claim 1, wherein the transmitting includes transmitting the failover traffic to the second network device via tunneling.

7. The method of claim 1, wherein the failover traffic includes control plane traffic.

8. The method of claim 1, further comprising:
receiving, by the first network device via a primary communication link, traffic originating from the primary location; and
transmitting, by the first network device the traffic, to a third network device of the primary location based on receiving the traffic via the primary communication link, wherein the third network device provides network performance evaluation on the traffic.

9. A system comprising:
a first network device of a first core network at a standby location associated with a geographic redundancy, the first network device comprising:
a first communication interface;
a first memory, wherein the first memory stores first instructions; and
a first processor, wherein the first processor executes the first instructions to:
receive, via the first communication interface and a standby communication link and an intermediary network that is between a first network, which includes the first core network, and a second network at a primary location, failover traffic that includes user plane traffic originating from the primary location associated with a failure of a primary network device of the second network, and the failover traffic is concurrently forwarded to a third network, which hosts an application service to which the failover traffic pertains, without traversing the second network and via the first core network;
select a second network device at the primary location to which to transmit the failover traffic based on the receipt of the failover traffic; and
transmit, via the first communication interface based on the selection, the failover traffic to the second network device via the standby communication link.

10. The system of claim 9, wherein the system further comprises the second network device, the second network device comprising:
a second communication interface;
a second memory, wherein the second memory stores second instructions; and
a second processor, wherein the second processor executes the second instructions to:
receive, via the second communication interface, the failover traffic;
transmit, the failover traffic to a third network device at the primary location, and wherein the system further comprises the third network device, the third network device comprising:
a third communication interface;
a third memory, wherein the third memory stores third instructions; and
a third processor, wherein the third processor executes the third instructions to:
receive, via the third communication interface, the failover traffic; and
perform, in response to the receipt of the failover traffic, network performance evaluation on the failover traffic.

11. The system of claim 9, wherein the failover traffic received by the first network device includes tapped user plane traffic received via an optical tap device located at the standby location.

12. The system of claim 9, wherein the primary network device is a core network device of a second core network and the second network at the primary location.

13. The system of claim 9, wherein the standby communication link communicates the failover traffic to a standby network device at the standby location that corresponds to the primary network device of the primary location.

14. The system of claim 9, wherein the transmission of the failover traffic includes transmission of the failover traffic to the second network device via tunneling.

15. The system of claim 9, wherein the failover traffic includes control plane traffic.

16. The system of claim 9, wherein the first processor further executes the first instructions to:
receive, via the first communication interface and a primary communication link, traffic originating from the primary location; and
transmit, the traffic via the first communication interface, to a third network device of the primary location based on the receipt of the traffic via the primary communication link, wherein the third network device provides network performance evaluation on the traffic.

17. A non-transitory computer-readable storage medium storing instructions executable by a processor of a network device of a first core network at a standby location associated with a geographic redundancy, which when executed cause the network device to:
receive, via a standby communication link of a standby location and an intermediary network between a first network, which includes the first core network, and a second network at a primary location, failover traffic that includes user plane traffic originating from the primary location associated with a failure of a primary network device of the second network, and the failover traffic is concurrently forwarded to a third network, which hosts an application service to which the failover traffic pertains, without traversing the second network and via the first core network;
select a second network device at the primary location to which to transmit the failover traffic based on the receipt of the failover traffic via the standby communication link; and
transmit, based on the selection, the failover traffic to the second network device via the standby communication link.

18. The non-transitory computer-readable storage medium of claim 17, wherein the failover traffic received by the first network device includes tapped user plane traffic received via an optical tap device located at the standby location.

19. The non-transitory computer-readable storage medium of claim 17, wherein the primary network device is a core network device of a second core network and the second network at the primary location.

20. The non-transitory computer-readable storage medium of claim 17, wherein the instructions further comprise instructions, which when executed cause the network device to:
  receive, via a primary communication link, traffic originating from the primary location; and
  transmit, the traffic, to a third network device of the primary location based on the receipt of the traffic via the primary communication link, wherein the third network device provides network performance evaluation on the traffic.

\* \* \* \* \*